(No Model.)
W. R. BACON.
APPARATUS FOR THE MANUFACTURE OF BLANK TICKETS OR CARDS.
No. 345,474. Patented July 13, 1886.
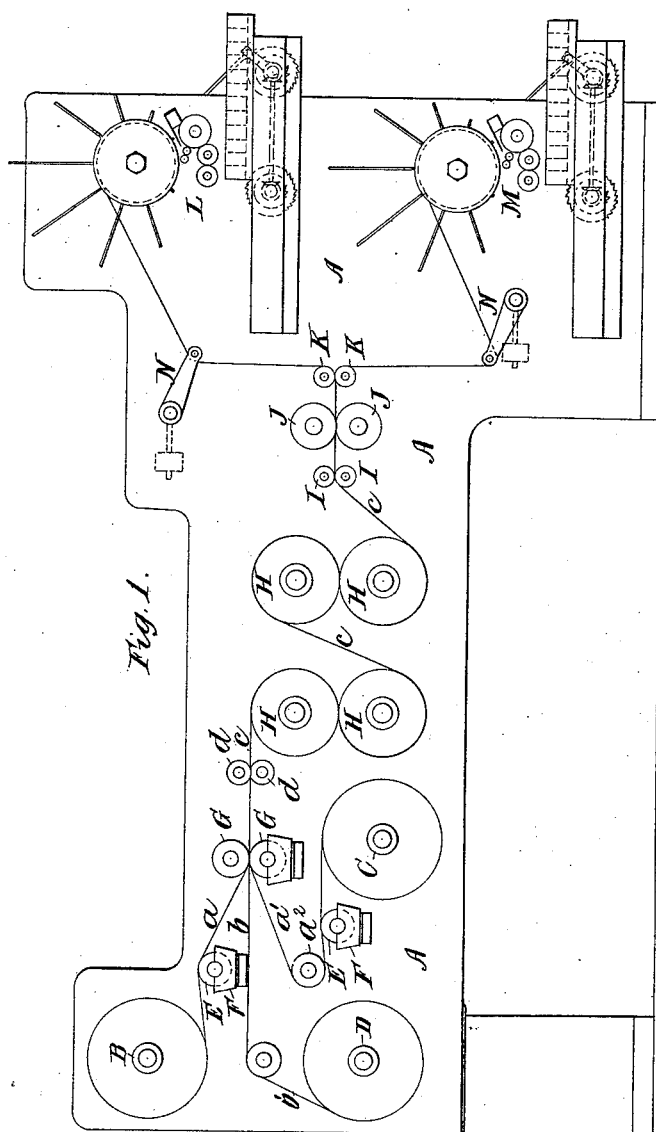
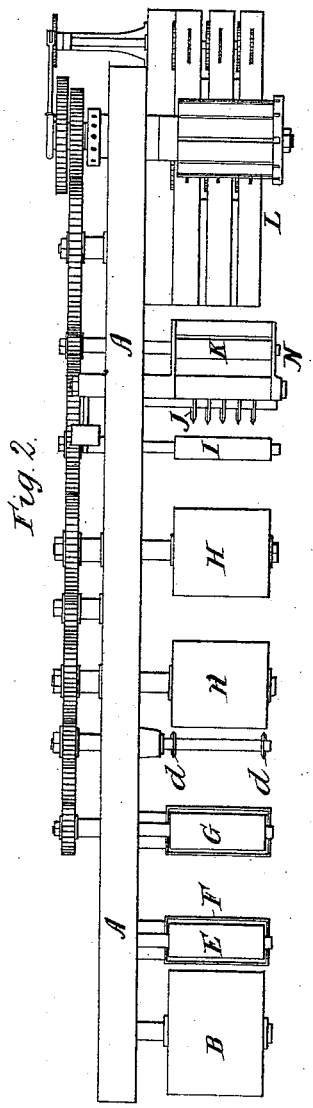
Witnesses.
Percy B Hills.
Robert Everett
Inventor.
Walter R. Bacon.
By James L. Norris.
Atty

UNITED STATES PATENT OFFICE.

WALTER RATHBONE BACON, OF LONDON, ENGLAND.

APPARATUS FOR THE MANUFACTURE OF BLANK TICKETS OR CARDS.

SPECIFICATION forming part of Letters Patent No. 345,474, dated July 13, 1886.

Application filed April 24, 1886. Serial No. 200,053. (No model.)

*To all whom it may concern:*

Be it known that I, WALTER RATHBONE BACON, a citizen of the United States of America, and a resident of London, England, have invented new and useful Improvements in Apparatus for the Manufacture of Blank Tickets or Cards, of which the following is a specification, reference being had to the accompanying drawings.

My invention is designed to provide for the manufacture of blank tickets or cards by first making continuous lengths or strips of cardboard or pasteboard and then cutting or dividing the same longitudinally and transversely.

My said invention comprises means for making and drying card-board or pasteboard, means for cutting the same longitudinally to divide it into strips of the width of a ticket or card, and means for cutting or dividing the said strips transversely to form the blank tickets or cards, and for collecting the said tickets or cards.

In the accompanying drawings, Figure 1 is a side elevation, and Fig. 2 a plan, of apparatus constructed according to my present invention.

A is the frame of the machine.

B C are reels or drums, on each of which is wound a continuous strip $a$ or $a'$, of thin paper of any desired width. These strips form the two facing or outer layers of the card-board or pasteboard.

D is a reel or drum having wound thereon a continuous strip or length, $b$, of thick paper, which constitutes the core of the card-board or pasteboard. If desired, this strip may be composed of two or more layers.

E E are cylinders or rolls, which are partially immersed in paste or other adhesive substance contained in troughs or receptacles F.

G G are two rolls, one of which is held with a yielding pressure against the other by means of springs, or by one or more weights.

H H are drying rolls or cylinders, which may be of any suitable description.

The strips $a\ a'$, of thin paper, are passed over and in contact with the rollers, E, whereby they are smeared or coated on their inner surfaces with adhesive material. They are then passed between the pressure-rolls G, with the core $b$ between them, the strip $a'$ being previously passed around a guide-roller, $a^2$. By means of the rolls G the strips $a\ a'$ are caused to adhere to the core $b$. The card-board or pasteboard, $c$, thus made is conducted from the pressure-rolls and passed around and between the drying rolls or cylinders H.

Between the pressure-rolls G and the drying rolls or cylinders H, I usually arrange rotary cutters $d$, for cutting or trimming the edges of the card-board or pasteboard before the same is dried. The card-board is conducted from the drying-rolls H between guide-rollers I, and then between cutters J, which cut or divide it longitudinally into a series of strips of the width of a ticket or card. It is then passed between guide-rollers K, which, with the guide-rollers I, serve to stretch and steady the card-board while being cut. The cutters J consist of rollers or cylinders having circular blades secured at suitable intervals thereon. After passing between the guide-rollers K every alternate strip of card-board is conducted to a device or apparatus, L, for cutting or dividing the said strips transversely and collecting the tickets or cards thus formed. The remaining strips are conducted to a similar device or apparatus, M. These devices or apparatus are preferably constructed substantially as described in the specification filed with my application for Letters Patent of the United States, April 7, 1886; Serial No. 198,160; but I may use any other suitable apparatus for cutting or dividing the strips transversely, and for collecting the tickets or cards. N N are weighted levers for taking up the slack of the strips and maintaining a suitable degree of tension thereon.

What I claim is—

1. The combination of means for making and drying card-board or pasteboard and means for cutting or dividing the same to form blank tickets or cards, substantially as set forth.

2. The combination of means for making and drying card-board or pasteboard and means for cutting or dividing the same longitudinally and trans- versely and collecting the tickets or cards thus formed, substantially as set forth.

3. The combination, with rotary cutters for dividing card-board or pasteboard longitudinally into strips, of two or more devices or apparatus for cutting or dividing said strips transversely and collecting the tickets or cards thus formed, substantially as and for the purpose set forth.

4. The combination of means, substantially as described, for making and drying card-board or paste-board, rotary cutters for dividing the same longitudinally into strips, and two or more devices or apparatus for cutting or dividing said strips and collecting the tickets or cards thus formed, substantially as set forth.

5. The combination of the rolls E and troughs F, the pressure-rolls G, the drying rolls or cylinders H, the rotary cutters J, and two or more devices or apparatus for cutting or dividing the strips of card-board transversely, substantially as and for the purpose set forth.

6. The combination of the rolls E and troughs F, the pressure-rolls G, the drying rolls or cylinders H, the rotary cutters J, and two or more cutting and collecting apparatus, L M, substantially as and for the purpose set forth.

In testimony whereof I have hereunto signed my name in the presence of two subscribing witnesses.

WALTER RATHBONE BACON.

Witnesses:
  W. R. LOWMAN,
  DAVID YOUNG.